United States Patent [19]

Steller

[11] 4,202,790
[45] May 13, 1980

[54] PEROXIDE BLENDS

[75] Inventor: Kenneth E. Steller, New Castle County, Del.

[73] Assignee: Hercules Incorporated, Wilmington, Del.

[21] Appl. No.: 919,096

[22] Filed: Jun. 26, 1978

[51] Int. Cl.$^2$ .................. C08F 8/06; C08J 3/24; C07C 179/14; C07C 179/06
[52] U.S. Cl. .................. 252/186; 252/95; 568/561; 525/387
[58] Field of Search ............. 252/186, 95; 260/502 R; 526/57; 568/561

[56] References Cited

U.S. PATENT DOCUMENTS

| | | | |
|---|---|---|---|
| 3,105,057 | 9/1963 | Medelia | 526/57 |
| 3,234,197 | 2/1966 | Baum | 526/57 |
| 3,362,924 | 1/1968 | Eastman | 526/57 |
| 3,661,877 | 5/1972 | Bluestein et al. | 526/57 |
| 3,939,133 | 2/1976 | Roodvosts | 526/57 |
| 4,015,058 | 3/1977 | Schober | 526/57 |
| 4,018,852 | 4/1977 | Schober | 526/57 |
| 4,025,706 | 5/1977 | Schober | 526/57 |

FOREIGN PATENT DOCUMENTS 47-6104 2/1972 Japan.
6805407 10/1968 Netherlands.
1092225 11/1967 United Kingdom.

Primary Examiner—Benjamin R. Padgett
Assistant Examiner—Irwin Gluck

[57] ABSTRACT

Disclosed are novel blends of peroxides that are liquid at room temperature. Blend (1) consists essentially of dicumyl peroxide and cumyl isopropylcumyl peroxide and blend (2) consists essentially of bis(alpha-t-butylperoxyisopropyl) benzene and isopropylcumyl t-butyl peroxide. The blends are useful in crosslinking polymers such as polyethylene.

7 Claims, No Drawings

PEROXIDE BLENDS

This invention relates to the chemical art. Particularly, this invention relates to novel peroxide blends that are liquid at room temperature (about 23° C.) and which are adapted particularly for use in the crosslinking of polymers such as polyethylene, EPDM, and copolymers of ethylene and vinyl acetate.

In this specification and in the claims, all parts and percentages are by weight unless otherwise specified.

Peroxide blend (1) of this invention consists essentially of from about 55% to about 25% dicumyl peroxide and from about 45% to about 75% cumyl isopropylcumyl peroxide.

Preferably, peroxide blend (1) consists essentially of from about 50% to about 40% dicumyl peroxide and from about 50% to about 60% cumyl isopropylcumyl peroxide.

Peroxide blend (2) of this invention consists essentially of from about 25% to about 10% bis(alpha-t-butylperoxyisopropyl) benzene and from about 75% to about 90% isopropylcumyl t-butyl peroxide.

Preferably, peroxide blend (2) consists essentially of from about 25% to about 20% bis(alpha-t-butylperoxyisopropyl) benzene and from about 75% to about 80% isopropylcumyl t-butyl peroxide.

Dicumyl peroxide and its method of preparation are well known in the art. Dicumyl peroxide has the formula (I) below

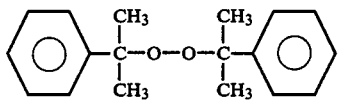

Dicumyl peroxide is a known crosslinking agent for certain polymers such as polyethylene. See, for example, U.S. Pat. Nos. 2,826,570; 2,888,424 and 3,079,370.

Dicumyl peroxide has a melting point of about 38° C.

Cumyl isopropylcumyl peroxide has the formula II below.

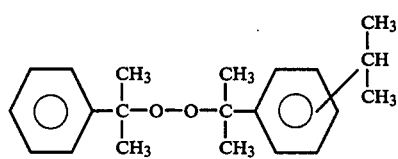

Specific examples of the above peroxide that can be used in this invention are cumyl m-isopropylcumyl peroxide and cumyl p-isopropylcumyl peroxide. Both the meta and para isomers are liquid at room temperature (about 23° C.). Mixtures of the meta and para isomers, a mixture of about 2 parts meta isomer and about 1 part para isomer for example, can be used in carrying out this invention. All meta and para mixtures are liquid at room temperature.

Cumyl isopropylcumyl peroxide is prepared by reaction of essentially equimolar portions of isopropyl-alpha,alphadimethylbenzyl alcohol and cumene hydroperoxide in an organic diluent that will not react with the reactants or the peroxide reaction product in the presence of a catalyst at a temperature of from about 30° C. to 75° C. Suitable catalysts include p-toluenesulfonic acid, sulfuric acid, boron trifluoride etherate, and benzenesulfonic acid.

EXAMPLE 1

The apparatus used in this example consisted of a 4-necked round-bottom flask equipped with a thermometer, a mechanical stirrer, and an ice water-cooled Friedrich condenser with a Barrett moisture trap. Reduced pressure was read on a U-tube manometer and controlled with a twenty-turn needle valve through appropriate hose connections.

To the flask were charged 400 grams (2.24 moles) of a mixture of the meta and para isomers of isopropyl-alpha,alphadimethylbenzyl alcohol (ratio of meta to para is about 2 to 1), 460 grams of a 81.4% solution of cumene hydroperoxide in cumene (2.46 moles cumene hydroperoxide), 573 grams heptane, and 4.26 grams (0.022 mole) p-toluenesulfonic acid monohydrate dissolved in 4.26 grams water. The mixture was stirred at 35°-40° C. under reduced pressure (94-99 Torr) until all water of reaction was removed (about 2.5 hours). At this point, the reaction mixture foamed slightly and became darker in appearance indicating that decomposition of the peroxide reaction product was beginning to take place.

200 ml. of a 5% aqueous solution of NaOH was added to the reaction mixture and the resulting mixture was transferred to a separatory funnel. The aqueous phase was removed from the funnel and the organic phase was washed 5 times with a 5% aqueous solution of NaOH and then 5 times with distilled water. The organic phase was dried over magnesium sulfate, stripped on a Rotovac rotary evaporator at 45° C. and 0.2 Torr for 3 hours, and finally at 90° C. in vacuo. The product, consisting essentially of a mixture of the meta and para isomers of cumyl isopropylcumyl peroxide, weighed 697 grams. The product, which was liquid at room temperature, contained about 87% peroxide as determined by the iodine liberation method, which represented an 86% yield based on the alcohol employed.

Bis-(alpha-t-butylperoxyisopropyl) benzene is well known in the art as are the methods for the preparation thereof. This bisperoxide has the formula (III) below.

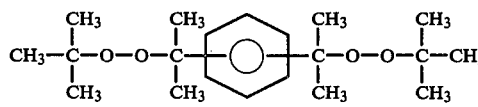

Specific examples of the bisperoxide are the meta and para isomers thereof. Mixtures of the meta and para isomers are commercially available and are preferred for use in this invention. The meta and para isomers are solid at room temperature as are all mixtures thereof. The meta isomer melts at about 52° C., the para isomer melts at about 79° C., and the eutectic mixture (80% meta isomer) melts at about 45° C.

Bis(alpha-t-butylperoxyisopropyl) benzene is a crosslinking agent for certain polymers such as polyethylene. See U.S. Pat. No. Re. 25,941.

Isopropylcumyl t-butyl peroxide is liquid at room temperature and has the formula (IV) below.

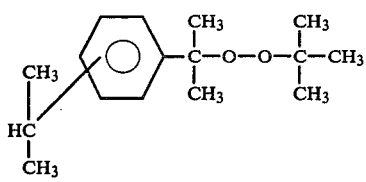
(IV)

Specific examples thereof are meta-isopropylcumyl t-butyl peroxide and para-isopropylcumyl t-butyl peroxide. Mixtures of the meta and para isomer, a mixture of about 2 parts meta isomer and about 1 part para isomer for example, can be used in carrying out this invention. All meta and para mixtures are liquid at room temperature.

This peroxide is prepared in essentially the same manner as isopropylcumyl cumyl peroxide described above with the exception that t-butyl hydroperoxide is used in place of cumene hydroperoxide.

EXAMPLE 2

The apparatus used in this example is the same as used in Example 1.

To the flask were charged 713 grams (4.0 moles) of a mixture of the meta and para isomers of isopropyl-alpha,alpha-dimethylbenzyl alcohol (ratio of meta to para is about 2 to 1), 440 grams of 90% aqueous solution of t-butyl hydroperoxide (4.4 moles of hydroperoxide), and 769 grams of heptane. The resulting mixture was stirred at 30°–35° C. while refluxing at reduced pressure until essentially all water present in the hydroperoxide solution had been collected in the Barrett trap. The trap was then drained of water and p-toluenesulfonic acid monohydrate (7.6 grams, 0.04 mole) dissolved in 7 ml. water was added to the mixture in the flask. Stirring at reflux (30°–35° C.) under reduced pressure was continued until no more water was being collected in the Barrett trap (about 9 hours). At that point the reaction mixture became darker in appearance.

250 ml. of a 5% aqueous solution of NaOH was added to the reaction mixture and the thus diluted reaction mixture was transferred to a separatory funnel. The aqueous phase was removed from the funnel and the organic phase was washed four more times with 5% aqueous solution of NaOH followed by three washes of 500 ml. of distilled water each. The organic phase was dried over MgSO$_4$, filtered, and stripped on a rotary evaporator; first at 50° C. with aspirator vacuum to remove heptane and finally at 65°–70° C. and 0.1 Torr. The product consisted essentially of a mixture of the meta and para isomers of isopropyl cumyl t-butyl peroxide. The product weighed 940.8 grams and contained 87.2% peroxide as determined by the iodine liberation method. This represented a yield of 82% based on the alcohol used. The product was a clear light yellow liquid at room temperature.

EXAMPLE 3

A peroxide blend that is liquid at room temperature (about 23° C.) was prepared by dissolving 50 parts dicumyl peroxide in 50 parts of the product of Example 1. The cumyl isopropylcumyl peroxide was a mixture of about 2 parts meta isomer and 1 part para isomer.

EXAMPLE 4

A peroxide blend that is liquid at room temperature was prepared by dissolving 25 parts bis(alpha-t-butylperoxyisopropyl) benzene (essentially a 2 to 1 mixture of the meta and para isomers) in 75 parts of the product of Example 2. The isopropylcumyl t-butyl peroxide was a mixture of about 2 parts meta isomer and 1 part para isomer.

EXAMPLES 5–8

The following polyethylene compositions were prepared and cured at 360° F.

| Composition | 5 | 6 | 7 | 8 |
| --- | --- | --- | --- | --- |
| Low density polyethylene - parts | 100 | 100 | 100 | 100 |
| Antioxidant (AgeRite Resin D) - parts | 0.5 | 0.5 | 0.5 | 0.5 |
| Dicumyl peroxide - parts | 1.8 | — | — | — |
| Example 3 peroxide blend - parts | — | 2.34 | — | — |
| bis(alpha-t-Butylperoxy-isopropyl)benzene - parts | — | — | 1.2 | — |
| Example 4 peroxide blend - parts | — | — | — | 2.03 |
| Cure time (min.) | 12 | 12 | 20 | 20 |

Physical properties of the cured compositions are set forth below in Table I.

TABLE I

| Cured Composition | 5 | 6 | 7 | 8 |
| --- | --- | --- | --- | --- |
| 100% Modulus (psi) | 1110 | 1115 | 1095 | 1165 |
| Tensile Strength (psi) | 2460 | 2450 | 2795 | 2500 |
| Elongation, % | 550 | 550 | 550 | 550 |
| Shore A Hardness | 96 | 96 | 96 | 96 |
| Shore D Hardness | 47 | 47 | 47 | 47 |
| Heat Distortion % (ASTM D2655) | 11.7 | 11.8 | 10.6 | 11.3 |

Dicumyl peroxide and bis(alpha-t-butylperoxyisopropyl) benzene are solids at room temperature. One of the disadvantages of these peroxides is that they must be melted in order to be uniformly dispersed in polymers, such as polyethylene, prior to cure. This causes additional expense to the user and is a source of danger as there is always the possibility of overheating, particularly by unskilled personnel, which can result in rapid decomposition of the peroxide and may even result in explosion. Blending of the solid peroxides with polymers, such as polyethylene, is not satisfactory in that it is difficult, if not impossible, to obtain uniform dispersion of the peroxide throughout the polymer. It is essential that the peroxide be uniformly dispersed in order to provide uniform curing or crosslinking of the polymer.

The peroxide blends of this invention, being liquid at room temperature, are easily and readily admixed with such polymers as polyethylene to provide essentially uniform blends of polymer and peroxide without undesirable effects. The polymer-peroxide compositions, after curing, have good physical properties.

It is to be understood that the above description and working examples are illustrative of this invention and not in limitation thereof.

What I claim and desire to protect by Letters Patent is:

1. A peroxide blend that is liquid at room temperature selected from the group consisting of (A) a peroxide blend consisting essentially of (1) from about 55% to about 25% dicumyl peroxide and (2) from about 45% to about 75% cumyl isopropylcumyl peroxide, and (B) a peroxide blend consisting essentially of (1) from about 25% to about 10% bis(alpha-t-butylperoxyisopropyl) benzene and (2) from about 75% to about 90% isopropylcumyl t-butyl peroxide.

2. A peroxide blend that is liquid at room temperature selected from the group consisting of (A) a peroxide blend consisting essentially of (1) from about 50% to about 40% dicumyl peroxide and (2) from about 50% to about 60% cumyl isopropylcumyl peroxide, and (B) a peroxide blend consisting essentially of (1) from about 25% to about 20% bis(alpha-t-butylperoxyisopropyl) benzene and (2) from about 75% to about 80% isopropylcumyl t-butyl peroxide.

3. A peroxide blend that is liquid at room temperature consisting essentially of (1) from about 50% to about 40% dicumyl peroxide and (2) from about 50% to about 60% cumyl isopropylcumyl peroxide.

4. A peroxide blend that is liquid at room temperature consisting essentially of (1) from about 25% to about 20% bis(alpha-t-butylperoxyisopropyl) benzene and (2) from about 75% to about 80% isopropylcumyl t-butyl peroxide.

5. The peroxide blend of claim 3 wherein peroxide (2) is a mixture of the meta and para isomers.

6. The peroxide blend of claim 4 wherein peroxide (1) is a mixture of the meta and para isomers and peroxide (2) is a mixture of the meta and para isomers.

7. In the method of crosslinking polymers using a peroxide curing agent the improvement wherein there is employed the peroxide blend of claim 3, 4, 5 or 6.